United States Patent
Mukherjee (10) Patent No.: US 7,472,299 B2
(45) Date of Patent: Dec. 30, 2008

(54) LOW POWER ARBITERS IN INTERCONNECTION ROUTERS

(75) Inventor: Shubhendu S. Mukherjee, Framingham, MA (US)

(73) Assignee: Intel Corporation, Santa Clara, CA (US)

(*) Notice: Subject to any disclaimer, the term of this patent is extended or adjusted under 35 U.S.C. 154(b) by 386 days.

(21) Appl. No.: 11/241,623

(22) Filed: Sep. 30, 2005

(65) Prior Publication Data

US 2007/0079036 A1    Apr. 5, 2007

(51) Int. Cl.
*G06F 1/26* (2006.01)
(52) U.S. Cl. .............. 713/323; 713/300; 713/310; 713/320; 713/321; 713/324; 713/330; 713/340
(58) Field of Classification Search .......... 713/300, 713/310, 320–324, 330, 340
See application file for complete search history.

(56) References Cited

U.S. PATENT DOCUMENTS

| | | | | |
|---|---|---|---|---|
| 4,835,422 | A * | 5/1989 | Dike et al. ............. | 327/19 |
| 5,652,895 | A * | 7/1997 | Poisner ................. | 713/322 |
| 5,845,139 | A * | 12/1998 | Fischer et al. ......... | 713/324 |
| 6,125,450 | A * | 9/2000 | Kardach ................ | 713/323 |
| 7,000,052 | B2 * | 2/2006 | Moon et al. ........... | 710/300 |
| 7,155,618 | B2 * | 12/2006 | Moyer et al. .......... | 713/320 |

OTHER PUBLICATIONS

Shubehendu, S. M., "The Alpha 21364 Network Architecture", *Compaq Computer Corporation: Jan.-Feb. 2002 Edition*, (2002), 26-35 (10 pgs.).
Kumar Rakesh, et al., "Interconnections in Multi-core Architectures: Understanding Mechanisms, Overheads and Scaling", *In Proceedings of the 32nd International Symposium on Computer Architecture*, (Jun. 2005),12 pages.
Mukherjee, Shubhendu S., et al., "A Comparative Study of Arbitration Algorithms for the Alpha 21364 Pipelined Router", *10th International Conference on Architectural Support for Programming Languages and Operating Systems (ASPLOS)*, (2002),12 pgs.
Mukherjee, Shubhendu S., et al., "Using Prediction to Accelerate Coherence Protocols", *Proceedings of the 25th Annual International Symposium on Computer Architecure (ISCA)*, (1998),12 pages.
Thottethode, Mithuna , et al., "Self-Tuned Congestion Control for Multiprocessor Networks", *Proceedings of the 7th International Symposium on High-Performance Computer Architecture*, (2001),12 pages.
Thottethodi, Mithuna , et al., "BLAM: A High-Performance Routing Algorithm for Virtual Cut-Through Networks", *International Parallel and Distributed Symposium*, Nice, France., (Apr. 2003),10 pages.
Wang, Hang-Sheng , et al., "How Hot Are Interconnection Networks-A Power Model for Routers", *SEMI/SEMATECH; SIA (Semiconductor Industry Association); DARPA*, (Aug. 21, 2002),11 pages.

* cited by examiner

*Primary Examiner*—Abdelmoniem Elamin
(74) *Attorney, Agent, or Firm*—Caven & Aghevli LLC (57) ABSTRACT

Methods and apparatus to reduce power consumption in arbiters of interconnection routers are described. In one embodiment, an arbiter may be turned off for a select number of clock cycles if no arbitration is to be performed on the corresponding buffer.

26 Claims, 6 Drawing Sheets

LOW POWER ARBITERS IN INTERCONNECTION ROUTERS

BACKGROUND

The present disclosure generally relates to the field of electronics. More particularly, an embodiment of the invention relates to reducing power consumption in arbiters utilized in interconnection routers.

As integrated circuit fabrication technology improves, manufacturers are able to integrate additional functionality onto a single silicon substrate. As the number of these functionalities increases, however, so does the number of components on a single chip. Additional components add additional signal switching, in turn, generating more heat. The additional heat may damage a chip by, for example, thermal expansion. Also, the additional heat may limit locations or applications of a computing system.

Interconnection routers may be used to communicate between various components of a computing system. An interconnection router generally includes an arbiter to determine which packets to route from input ports of the router to output ports of the router. Accordingly, an arbiter may consume power and generate heat each time a router communicates a data packet.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Figure 1:
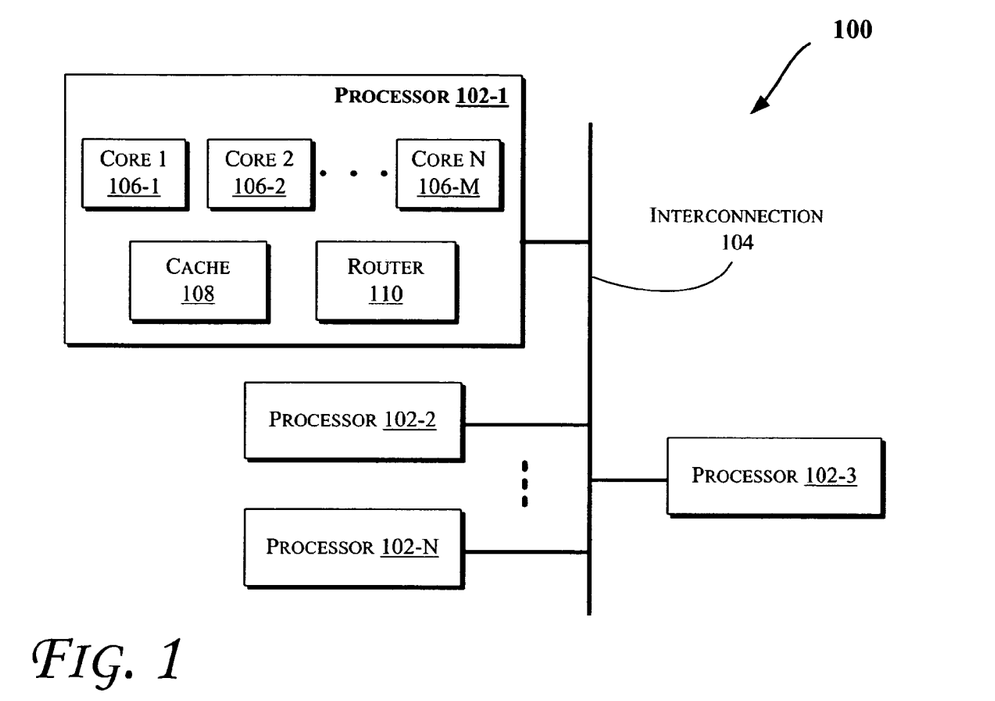
FIG. 1 illustrates a block diagram of a system, according to an embodiment of the invention.

Some of the embodiments discussed herein may reduce power consumption in routers which route data between various electronic components, such as those discussed with reference to FIGS. 1, 6, and 7. More particularly, FIG. 1 illustrates a block diagram of a system 100, according to an embodiment of the invention. The system 100 may include one or more processors 102-1 through 102-N (generally referred to herein as "processors 102"). The processors 102 may communicate via an interconnection network or bus 104. Each of the processors may include various components some of which are only discussed with reference to processor 102-1 for clarity. Accordingly, each of the remaining processors 102-2 through 102-N may include the same or similar components discussed with reference to the processor 102-1. Additionally, the embodiments discussed herein are not limited to multiprocessor computing systems and may be applied in a single processor computing system.

The processor 102-1 may include one or more processor cores 106-1 through 106-M (generally referred to herein as "cores 106"), a cache 108, and/or a router 110. The processor cores 106 may be implemented on a single integrated circuit chip. Moreover, the chip may include one or more shared or private caches (such as cache 108), interconnects (such as 104), memory controllers (such as those discussed with reference to FIGS. 6 and 7), or the like.

The cache 108 may store instructions and/or data that are utilized by one or more components of the processor 102-1. In an embodiment, the cache 108 (that may be shared), such as a level 1 (L1) cache, a level 2 (L2) cache, or the like. Various components of the processor 102-1 may be coupled to the cache 108 directly, through a bus, and/or memory controller or hub. Also, the processor 102-1 may include more than one cache 108.

The router 110 may be coupled to various components of the processor 102-1 and other components outside of the processor 102-1 to route data between these components. For example, the router 110 may be coupled to various components through the bus 104. Furthermore, the router 110 may be coupled to the processor cores 106 and the cache 108 to route data stored in the cache 108 to the cores 106 and vice versa. Additionally, the processor 102-1 may include more than one router 110. The multitude of routers (110) may be coupled to enable data routing between various components inside or outside of the processor 102-1. Further details of some embodiments of the router 110 will be further discussed herein with reference to FIGS. 3-7.

Figure 2:
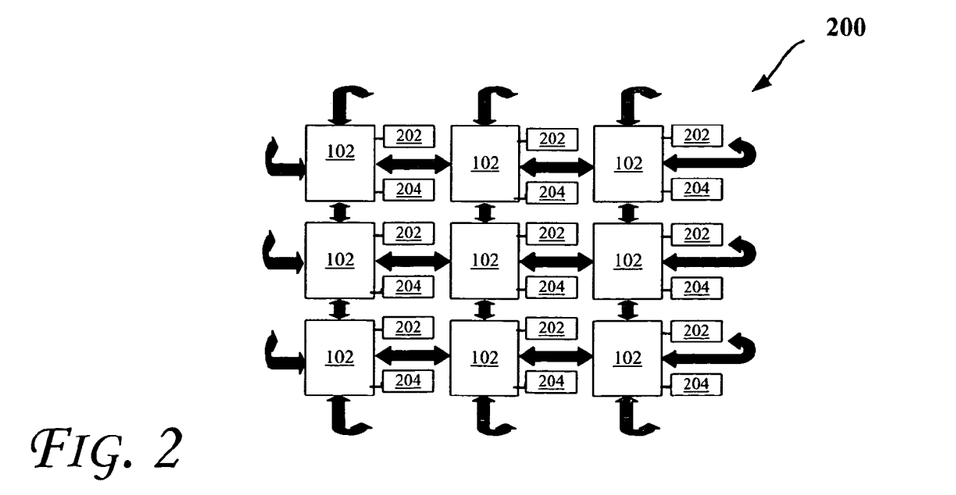
FIG. 2 illustrates a block diagram of a two-dimensional interconnection network, according to an embodiment.

The techniques discussed herein may be utilized in various topologies. For example, networks may take the form of a K-ary N-cube network, where K corresponds to the number of nodes in the network and N corresponds to the number of dimensions. Moreover, in various embodiments, a two-dimensional (2D), 3D, or 4D torus network may utilize embodiments of the invention discussed herein. More specifically, FIG. 2 illustrates a block diagram of a 2D interconnection network 200, according to an embodiment. For example, as shown in FIG. 2, the network 200 may include 9 processors (102). Each of the processors (102) may be coupled to a memory (202) and an input/output (I/O) interface (204).

Furthermore, the network arrangement shown in FIG. 2 may be considered a 2D torus network. Packets may be routed from a source to destination within a minimum rectangle formed by the source and destination. Furthermore, other embodiments may be used in connection with irregular network topologies. Still further, embodiments may be used in connection with a fat tree network. In yet other embodiments, the techniques may be performed in a mini-core-based system in which a plurality of mini-cores are coupled in a given network topology, as a 1D torus, a 2D torus, or a 3D torus, for example.

Figure 3:
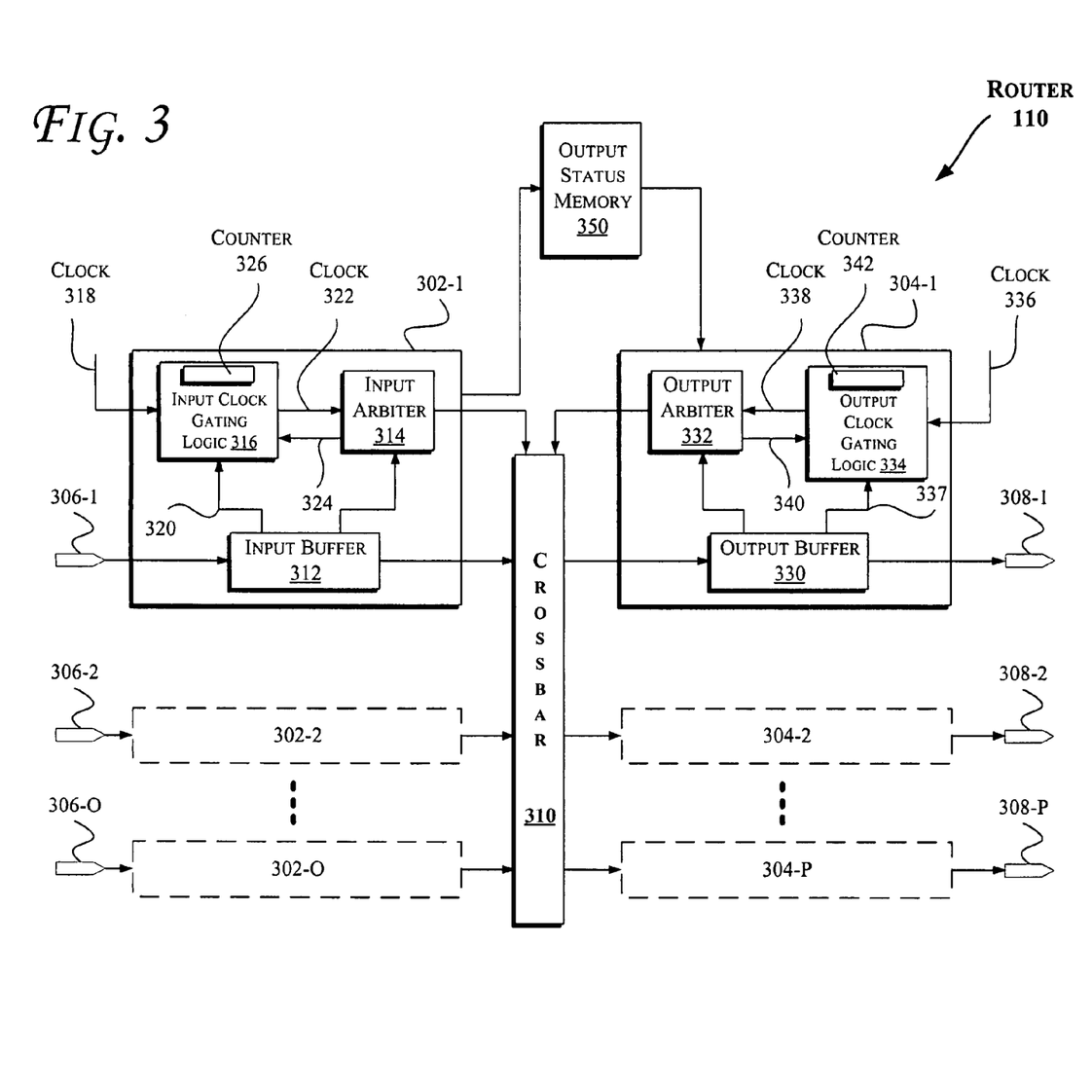
FIG. 3 illustrates a block diagram of an embodiment of an interconnection network router.

FIG. 3 illustrates a block diagram of an embodiment of an interconnection network router, such as the router 110 discussed with reference to FIG. 1. In one embodiment, the arrows in FIG. 3 indicate the direction of data or signal flow between components shown in FIG. 3. The router 110 may include one or more input circuits 302-1 through 302-O (generally referred to herein as "input circuits 302") and one or more output circuits 304-1 through 304-P (generally referred to herein as "output circuits 304"). As shown in FIG. 3, each of the input circuits 302 may be coupled to an input port (such as input ports 306-a through 306-O, generally referred to "input ports 306") and each of the output circuits 304 may be coupled to an output port (such as input ports 308-*a* through 308-P, generally referred to "output ports 308"). The input circuits 302 may be coupled to the output circuits 304 via a crossbar 310. Hence, the router 110 may route data packets from the input ports 306 through the input circuits 302, crossbar 310, and the output circuits 304 to the output ports 308.

Each of the input circuits 302 and the output circuits 304 may include various components some of which are only discussed with reference to the circuits 302-1 and 304-1, respectively, e.g., for clarity. Accordingly, each of these remaining circuits may include the same or similar components discussed with reference to the circuits 302-1 and 304-1.

In one embodiment, the input circuit 302-1 may include an input buffer 312 to store data received from the input port 306-1 for dispatch to the crossbar 310. The input buffer 312 may be coupled to an input arbiter 314. The input arbiter 314 may determine which data packets are routed from the input buffer 312 to an output port (e.g., one of the output ports 308) via the crossbar 310. For example, the input arbiter 314 may provide control data to the crossbar 310 regarding the destination output port of a data packet stored in the input buffer 312. The input arbiter 314 may perform other operations as will be further discussed herein.

The input circuit 302-1 may further include an input clock gating logic 316 that receives a clock signal 318 (e.g., a clock signal provided by the processor 102-1 of FIG. 1 or a system clock). The input clock gating logic 316 may be coupled to the input buffer 312 to determine the state of the input buffer 312 (e.g., empty, full, etc.) via an input buffer state signal 320. Also, the input clock gating logic 316 may generate a clock signal 322 (e.g., based on the clock signal 318) that is provided to the input arbiter 314. For example, the input clock gating logic 316 may utilize an AND gate to combine the clock 318 with a clock gating enable signal (not shown) to generate the clock 322. The clock gating enable signal may be asserted based on various criteria such those discussed with reference to FIGS. 4 and 5 that allow the input arbiter to be turned off.

Furthermore, the input arbiter 314 may provide the number of clock cycles that it takes to dispatch a packet through the input buffer 312 to the input clock gating logic 316 via a signal 324. The number of clock cycles may be stored in a clock cycle counter 326. The counter 326 may be provided in any suitable location within the processors 102 of FIG. 1. For example, the counter 326 may be stored as a variable in the cache 108 of FIG. 1. As will be further discussed with reference to FIG. 4, the input clock gating logic 316 may turn off the arbiter 314 (e.g., by turning off the clock 322) if the input buffer 312 is empty (e.g., as indicated by the signal 320), or for a select number of clock cycles (e.g., as indicated by the value stored in the counter 326) if no arbitration is to be performed (e.g., by the arbiter 314) on the input buffer 312.

In an embodiment, the output circuit 304-1 may include an output buffer 330 to store data received from an input port (e.g., one of the input ports 306) for dispatch to the output port 308-1 via the crossbar 310. The output buffer 330 may be coupled to an output arbiter 332. The output arbiter 332 may determine which data packets are routed from an input port (e.g., one of the input ports 306) to the output port 308-1 via the crossbar 310. For example, the output arbiter 332 may provide control data to the crossbar 310 regarding the data packet transmitted via the output port 308-1. The output arbiter 332 may perform other operations as will be further discussed herein.

The output circuit 304-1 may further include an output clock gating logic 334 that receives a clock signal 336 (e.g., a clock signal provided by the processor 102-1 of FIG. 1 or a system clock). The output clock gating logic 334 may be coupled to the output buffer 330 to determine the state of the output buffer 330 (e.g., empty, full, etc.) via an output buffer state signal 337. Also, the output clock gating logic 334 may generate a clock signal 338 (e.g., based on the clock signal 336) that is provided to the output arbiter 332. For example, the output clock gating logic 334 may utilize an AND gate to combine the clock 336 with a clock gating enable signal (not shown) to generate the clock 338. The clock gating enable signal may be asserted based on various criteria such as those discussed with reference to FIGS. 4 and 5 that allow the input arbiter to be turned off.

Additionally, the output arbiter 3332 may provide the number of clock cycles that it takes to dispatch a packet through the output buffer 330 to the output clock gating logic 334 via a signal 340. The number of clock cycles may be stored in a clock cycle counter 342. The counter 342 may be provided in any suitable location within the processors 102 of FIG. 1. For example, the counter 342 may be stored as a variable in the cache 108 of FIG. 1. As will be further discussed with reference to FIG. 4, the output clock gating logic 334 may turn off the arbiter 332 (e.g., by turning off the clock 338) if the output buffer 330 is empty (e.g., as indicated by the signal 337), or for a select number of clock cycles (e.g., as indicated by the value stored in the counter 342) if no arbitration is to be performed (e.g., by the arbiter 332) on the output buffer 330.

The router 110 may also include an output status memory 350 coupled to the input circuits 302 and output circuits 304. The memory 350 may store data regarding the potential future status of the output buffers (e.g., such as the output buffer 330). In one embodiment, the memory 350 may be a hardware register or a. variable stored in a shared memory (such as in the cache 108 of FIG. 1) that includes one bit for each of the output buffers in the output circuits 304. The bits may be used to indicate whether an output buffer may be receiving (or is a candidate to receive) a data packet in a given number of next clock cycles (e.g., the next clock cycle) from one of the input circuits 302 (or more specifically an input buffer such as the input buffer 312). Alternatively, a counter (rather than a single bit) may be used to indicate the potential future status of each of the output buffers, such as discussed with reference to FIG. 4.

In an embodiment, the input circuits 302 (e.g., the input arbiter 314) may access the memory 350 to store an appropriate indication of whether data from the input buffer 312 may be potentially passed to one of the output circuits 304 (e.g., by setting or clearing a corresponding bit, or incrementing a counter). As will be further discussed with reference to FIG. 4, each time a packet leaves an output buffer (or finishes dispatching through the output buffer), e.g., the output buffer 330, the output circuits 304 (e.g., the output clock gating logic 334) may access the memory 350 to determine whether data from an input buffer (e.g., the input buffer 312) may be destined for one of the output circuits 304 (e.g., if a corresponding bit is set or clear). Based on this determination (and/or signals 377 or 340), the output clock gating logic 334 may turn off the output arbiter 332, e.g., to reduce power consumption when no arbitration is to be performed on the output buffer 330. In an embodiment where a counter is used for each output buffer status (rather than a single bit), the output circuits 304 (e.g., the output arbiter 332) may decrement the corresponding counter (e.g., stored in the memory 350) each time a packet leaves the corresponding output buffer.

Furthermore, in various embodiments, each arbiter (e.g., arbiter 314 or arbiter 332) may examine a number of variables to decide whether that arbiter can select and forward packets from its corresponding buffer (e.g., buffers 312 or 330, respectively). The specific condition may depend on the nature of the router and the topology of the network (such as the topologies discussed with reference to FIG. 2). For example, an input arbiter (314) may examine the following conditions: are there packets waiting at the input buffer 312 for dispatch, which output ports (308) a packet may legally be routed through (which in turn depends on the routing algorithm for the network), will the corresponding target output port(s) be free in a specific cycle that the input arbiter 314 is intending to schedule a packet dispatch from the input buffer 312, does an anti-starvation algorithm need to be initiated (e.g., to block packets to avoid live locks, etc.). Moreover, an output arbiter (332) may examine conditions, such as a packet has been selected for dispatch in a specific cycle, which packets to dispatch given a choice of packets, etc.

Figure 4:
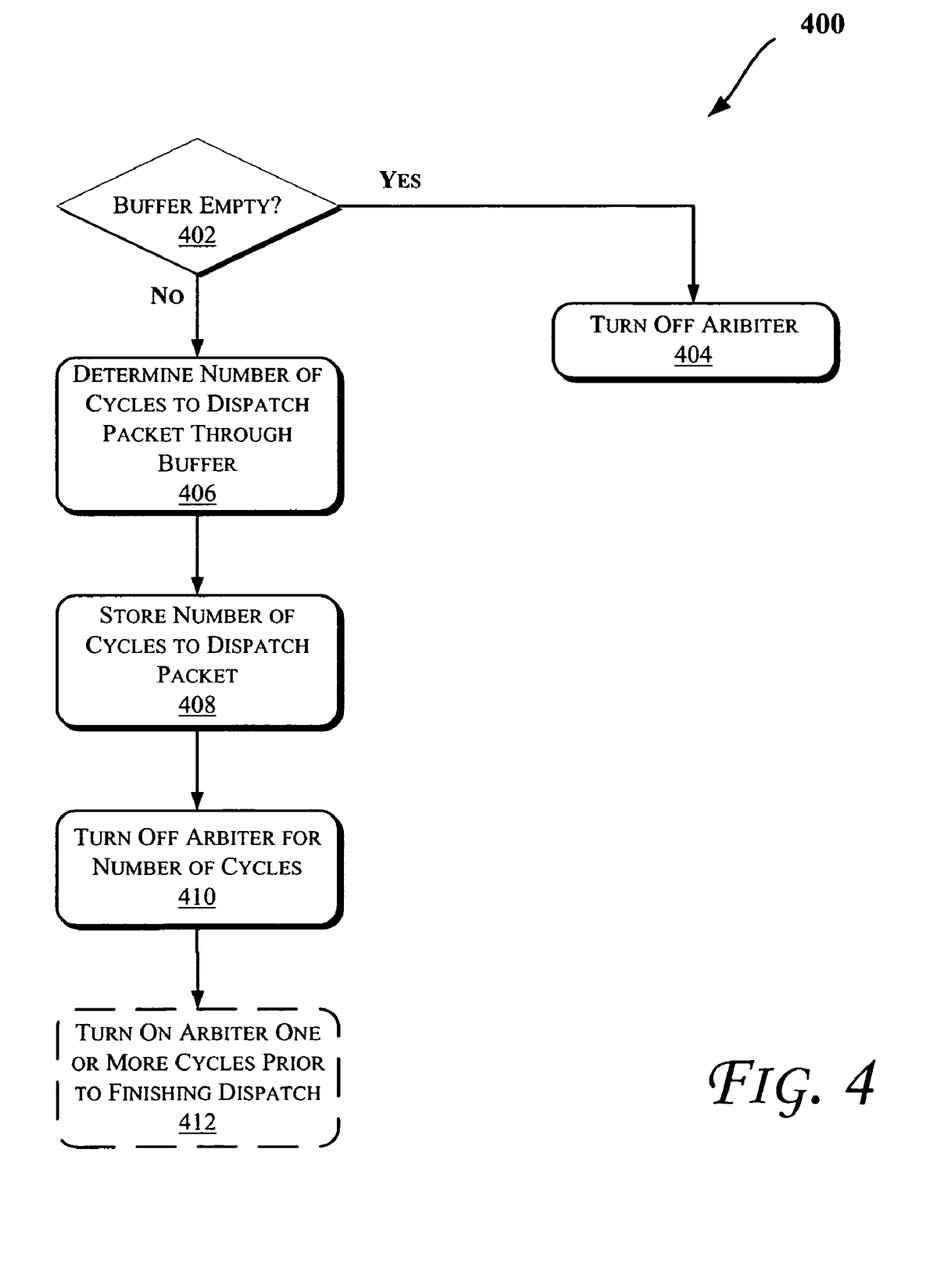
FIGS. 4 and 5 illustrate flow diagrams of methods in accordance with various embodiments of the invention.

FIG. 4 illustrates a flow diagram of an embodiment of a method 400 to reduce power consumption in an interconnection router, such as the router 110 discussed with reference to FIGS. 1 and 3. In one embodiment, the operations of the method 400 may be performed by one or more of the components of a processor, such as the components discussed with reference to FIGS. 1-3.

Referring to FIGS. 1-4, the clock gating logic (e.g., logic 316 or logic 334) may determine whether its corresponding buffer (e.g., buffer 312 or buffer 330, respectively) is empty (402). If the corresponding buffer is empty, the clock gating logic (e.g., logic 316 or logic 334) may turn off the corresponding arbiter (e.g., arbiter 314 or arbiter 332, respectively). Otherwise, if the corresponding buffer is not empty, at an operation 406, the arbiter (e.g., arbiter 314 or arbiter 332) may determine the number of cycles that it takes to dispatch a packet through the corresponding buffer (e.g., input buffer 312 or output buffer 330, respectively). The determined number of cycles may be stored (408), e.g., in a corresponding cycle counter (such as the counter 326 or counter 342; respectively), as discussed with reference to FIG. 3.

At an operation 410, the clock gating logic (e.g., logic 316 or logic 334) may turn off the corresponding arbiter (e.g., input arbiter 314 or output arbiter 332, respectively) for the determined number of cycles of the operation 406. Optionally, at an operation 412, the input clock gating logic (e.g., logic 316 or logic 334) may turn on the corresponding arbiter (e.g., input arbiter 314 or output arbiter 332, respectively) one or more clock cycles prior to finishing the dispatch of the packet through the corresponding buffer (e.g., input buffer 312 or output buffer 330, respectively). This may allow a reduced latency such that the corresponding arbiter is fully operational prior to receiving a future packet.

Figure 5:
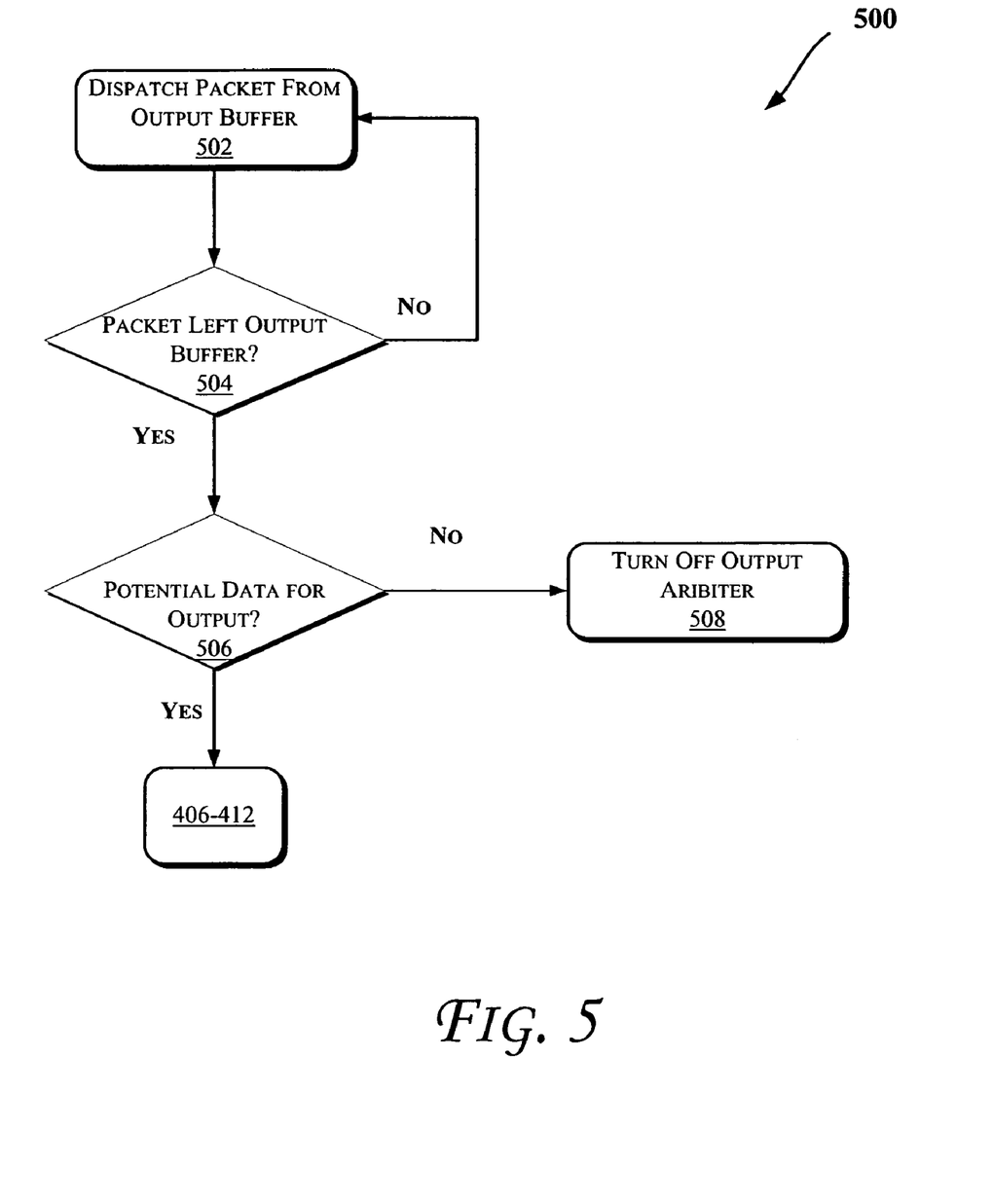

FIG. 5 illustrates a flow diagram of an embodiment of a method 500 to reduce power consumption by an output arbiter, such as the output arbiter 332 discussed with reference to FIG. 3. In one embodiment, the operations of the method 500 may be performed by one or more of the components of a processor, such as the components discussed with reference to FIGS. 1-3.

Referring to FIGS. 1-5, packets stored in the output buffer 330 may be dispatched at an operation 502 through the output port 308-1. As discussed with reference to FIG. 3, the input circuits 302 (e.g., the input arbiter 314) may access the memory 350 to store an appropriate indication of whether data from the input buffer 312 may be potentially passed to one of the output circuits 304. When a packet leaves the output buffer 330 (504), the output circuits 304 (e.g., the output clock gating logic 334) may access the memory 350 to determine (e.g., based on the stored indications) if any other packets may potentially be dispatched through a given output circuit (e.g., the output circuit 304-1) in at least the next clock cycle. Based on this determination (and/or signals 377 or 340), the output clock gating logic 334 may turn off the output arbiter 332, e.g., to reduce power consumption when no arbitration is to be performed on the output buffer 330 at operation 508. If there is data packets that may potentially be destined to the output circuit, the method 500 may perform one or more operations 406 through 412 for the corresponding output circuitry, such as discussed with reference to FIG. 4.

In one embodiment, the number of cycles determined at the operation 406 of FIG. 4, may be predicted based on one or more of the operational history of a router or the presence of a hotspot. Hence, these techniques may be utilized to predict when an arbiter (e.g., arbiter 314 or arbiter 332) is not active for one or more cycles. Based on this prediction, the corresponding clock gating logic (e.g., logic 316 or 334, respectively) may turn the arbiter on or off. However, if a prediction is incorrect, there may be a performance penalty. For example, if a prediction indicates that no packet will be arriving at the input buffer (312) for 10 cycles, the input clock gating logic 316 may turn off the clock 322 to the input arbiter 314, and optionally inform a router, within the same processor or another processor, coupled to the input port 306-1 not to send any packets for another 10 cycles. In a case where a router coupled to the input port 306-1 is ready to send a packet in 4 cycles, the communication from that router will be delayed by 6 cycles with the incorrect 10-cycle prediction. This may degrade performance. In contrast, in a deterministic clock gating scheme, there may be no performance loss due to incorrect predictions.

In an embodiment, coherence data packet patterns may be captured using a two-level history-based technique. The first level may capture the packet sequence and the second level may capture the corresponding prediction. For example, the input buffer 312 may be used to provide the first level (or the packet sequence). A prediction table may be used to store information regarding number of packets routed between various input ports 306 and the corresponding output ports 308. This information may be used to predict the destination of the next packet arriving at the input buffer 312. Based on this prediction, the corresponding register bits or counters may be updated in the memory 350.

In one embodiment, the number of cycles for which an arbiter is turned off may be determined based on the presence of hotspots. Generally, a hotspot is an area of congestion in which communications are delayed. Hotspots may be detrimental to the performance of a network. Hotspots may build up due to congestion at specific localized areas of a network. The presence of a hotspot may, over time, lead to tree saturation, where the effect of the local congestion propagates through different regions of the network. In one embodiment, to reduce injection of more packets into the network that has a hotspot, the source (or input ports that obtain packets from caches, etc, as opposed to the network ports that connect routers 110) may be turned off or throttled. When a hotspot is present, the input clock gating logic (316) may turn off the local input ports that generate new traffic (e.g., by turning off their corresponding arbiter (314)). When tree saturation is detected, the input and output port arbiters that may be involved in the tree saturation may be turned off or throttled. The latter action would attempt to clear up the hotspots and, thereby provide better performance.

In an embodiment, the presence of remote hotspots may be detected locally. For example, packets communicated between a plurality of routers (such as the router 110 discussed with reference to FIG. 1) may be time-stamped. After receiving time-stamped packets from at least two source routers at a destination router, the destination router may calculate the transit time for each of the time-stamped packets. The calculated transit times may then be compared with a threshold to determine whether a hotspot may be present between the two source routers and the destination routers. Furthermore, test packets may be sent to more accurately determine the location of a hotspot.

Moreover, in one embodiment, the level of the voltage supplied to a virtual channel of the buffer (e.g., buffers 312 or 330) and/or the arbiter (e.g., arbiter 314 or arbiter 332) that are part of a congestion tree may be reduced or scaled down. Generally, a buffer (e.g., buffers 312 or 330) may be divided into a number of virtual channels, e.g., to reduce head-of-the-line blocking. However, when saturation builds up, packets in one virtual channel may start blocking other virtual channels. In an embodiment, specific virtual channels may be throttled to allow the hotspot to clear. More particularly, the voltage supply of the virtual channel buffers and associated arbitration logic for virtual channels that are not directly part of the congestion tree may be scaled down. Then, for example, instead of acquiring a physical buffer channel every N cycles, a virtual channel may access the physical buffer channel every 2N cycles. Thus, the virtual channel not engaged in tree saturation may be throttled. This may additionally reduce the power dissipation, e.g., within the buffers. In one embodiment, multiple voltage planes may be utilized for the routers to control the voltage supply. Alternatively, on-chip voltage regulators may be used to adjust the voltage levels.

Figure 6:
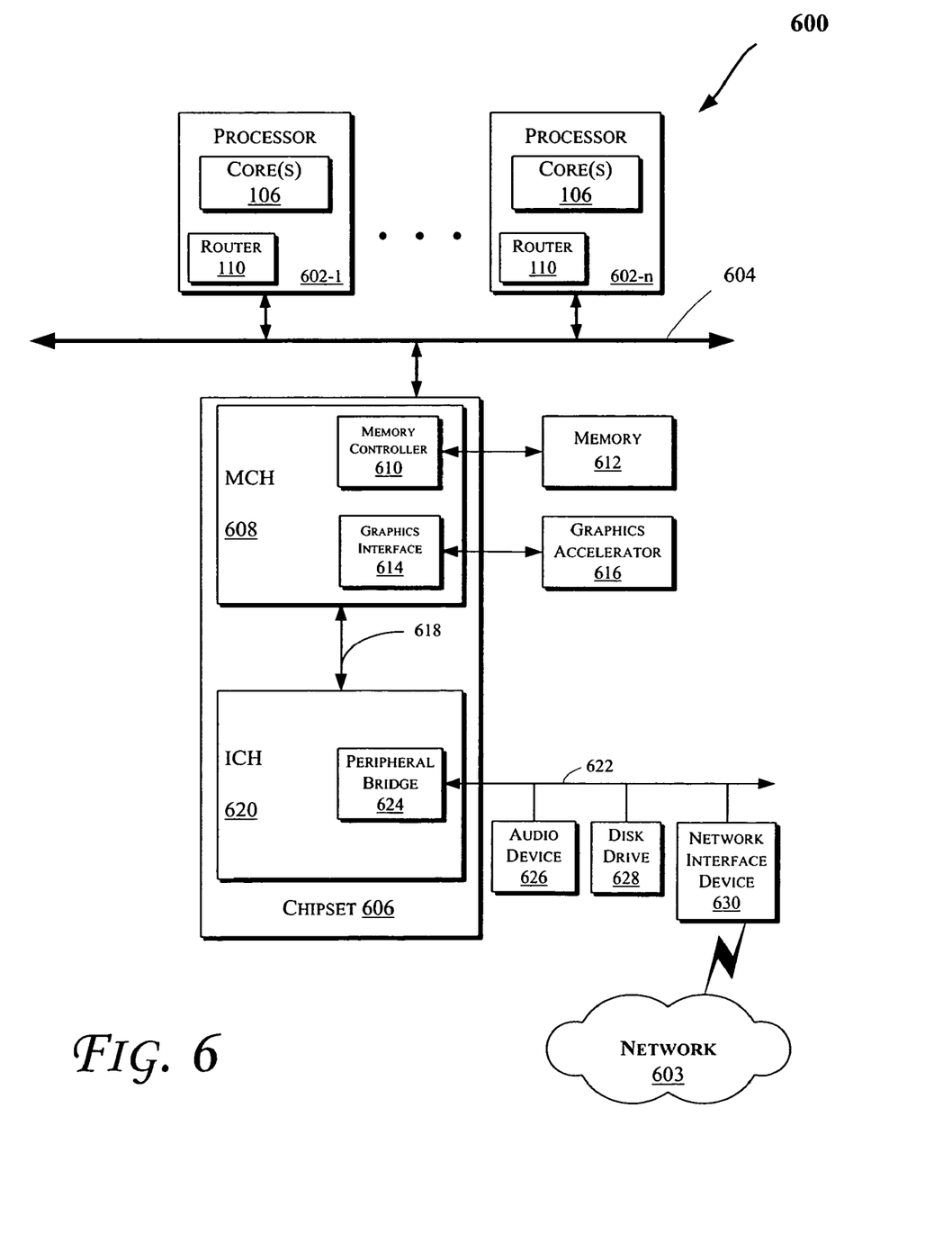
FIGS. 6 and 7 illustrate block diagrams of computing systems in accordance with various embodiments of the invention.

FIG. 6 illustrates a block diagram of a computing system 600 in accordance with an embodiment of the invention. The computing system 600 may include one or more central processing unit(s) (CPUs) 602 or processors coupled to an interconnection network (or bus) 604. The processors (602) may be any suitable processor such as a general purpose processor, a network processor (that processes data communicated over a computer network 603), or the like (including a reduced instruction set computer (RISC) processor or a complex instruction set computer (CISC)). Moreover, the processors (602) may have a single or multiple core design. The processors (602) with a multiple core design may integrate different types of processor cores on the same integrated circuit (IC) die. Also, the processors (602) with a multiple core design may be implemented as symmetrical or asymmetrical multiprocessors. In an embodiment, one or more of the processors 602 may the same or similar to the processors 102 of FIG. 1. For example, one or more of the processors 602 may include one or more of the cores 106 and/or router 110. Also, the operations discussed with reference to FIGS. 1-5 may be performed by one or more components of the system 600.

A chipset 606 may also be coupled to the interconnection network 604. The chipset 606 may include a memory control hub (MCH) 608. The MCH 608 may include a memory controller 610 that is coupled to a memory 612. The memory 612 may store data and sequences of instructions that are executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or the like. Nonvolatile memory may also be utilized such as a hard disk. Additional devices may be coupled to the interconnection network 604, such as multiple CPUs and/or multiple system memories.

The MCH 608 may also include a graphics interface 614 coupled to a graphics accelerator 616. In one embodiment of the invention, the graphics interface 614 may be coupled to the graphics accelerator 616 via an accelerated graphics port (AGP). In an embodiment of the invention, a display (such as a flat panel display) may be coupled to the graphics interface 614 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 618 may couple the MCH 608 to an input/output control hub (ICH) 620. The ICH 620 may provide an interface to I/O devices coupled to the computing system 600. The ICH 620 may be coupled to a bus 622 through a peripheral bridge (or controller) 624, such as a peripheral component interconnect (PCI) bridge, a universal serial bus (USB) controller, or the like. The bridge 624 may provide a data path between the CPU 602 and peripheral devices. Other types of topologies may be utilized. Also, multiple buses may be coupled to the ICH 620, e.g., through multiple bridges or controllers. Moreover, other peripherals coupled to the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

The bus 622 may be coupled to an audio device 626, one or more disk drive(s) 628, and a network interface device 630 (which is coupled to the computer network 603). Other devices may be coupled to the bus 622. Also, various components (such as the network interface device 630) may be coupled to the MCH 608 in some embodiments of the invention. In an embodiment, one or more routers (110) discussed with reference to FIGS. 1-5 may be provided in the network interface device 630. In addition, the processor 602 and the MCH 608 may be combined to form a single chip. Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media suitable for storing electronic instructions and/or data.

Figure 7:
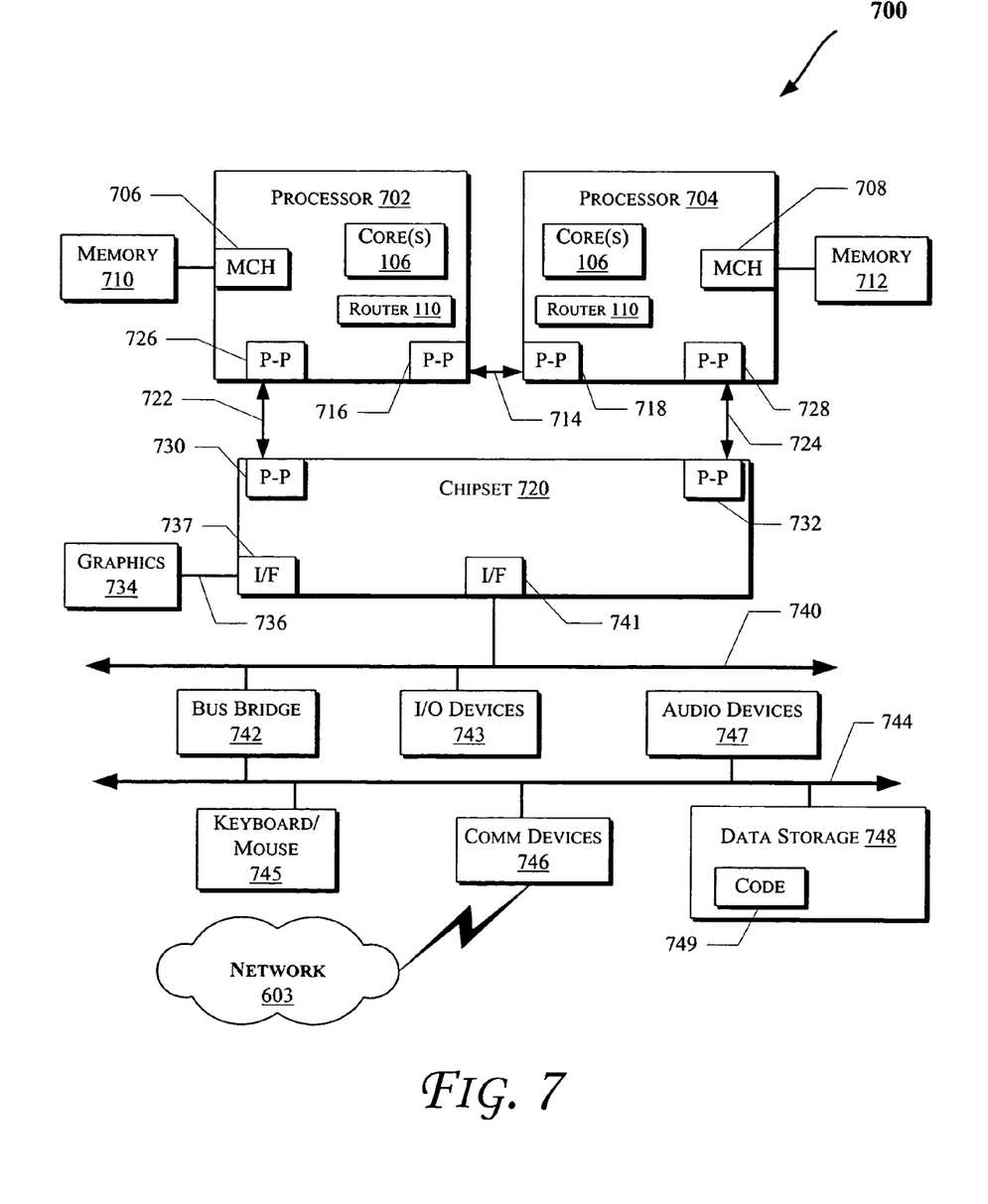

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to couple with memories 710 and 712. The memories 710 and/or 712 may store various data such as those discussed with reference to the memories 350 and/or 612.

The processors 702 and 704 may be any suitable processor such as those discussed with reference to the processors 602 of FIG. 6. The processors 702 and 704 may exchange data via a point-to-point (PtP) interface 714 using PtP interface circuits 716 and 718, respectively. The processors 702 and 704 may each exchange data with a chipset 720 via individual PtP interfaces 722 and 724 using point to point interface circuits 726, 728, 730, and 732. The chipset 720 may also exchange data with a high-performance graphics circuit 734 via a high-performance graphics interface 736, using a PtP interface circuit 737.

At least one embodiment of the invention may be provided within the processors 702 and 704. For example, the processor core 100 of FIG. 1 may be located within the processors 702 and 704. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may be coupled to a bus 740 using a PtP interface circuit 741. The bus 740 may have one or more devices coupled to it, such as a bus bridge 742 and I/O devices 743. Via a bus 744, the bus bridge 743 may be coupled to other devices such as a keyboard/mouse 745, communication devices 746 (such as modems, network interface devices, or the like that may be coupled to the computer network 603), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include any suitable storage device such as those discussed with respect to FIGS. 1, 2, 3, 6, and 7.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be underwood that claimed subject matter may not be limited to the specific features or acts described. Rather, the specific features and acts are disclosed as sample forms of implementing the claimed subject matter.

What is claimed is:

1. A method comprising:
   turning off an arbiter for a select number of clock cycles if no arbitration is to be performed on a corresponding buffer; and
   determining the select number of clock cycles based on a number of clock cycles that it takes to dispatch a packet through the corresponding buffer.

2. The method of claim 1, further comprising turning off the arbiter if the corresponding buffer is empty.

3. The method of claim 1, further comprising turning on the arbiter one or more clock cycles prior to finishing a dispatch of a packet through the corresponding buffer.

4. The method of claim 1, wherein the arbiter is an output arbiter and the corresponding buffer is an output buffer, the method further comprising turning off the output arbiter if an output status memory indicates that the output buffer will receive no data in at least a next clock cycle.

5. The method of claim 1, wherein the arbiter is an output arbiter and the corresponding buffer is an output buffer, the method further comprising determining whether another packet is awaiting dispatch through the output buffer when a packet leaves the output buffer.

6. The method of claim 1, further comprising determining the select number of clock cycles based on one or more of an operational history of a router or a presence of a hotspot.

7. The method of claim 1, further comprising reducing a level of a voltage supplied to one or more of a virtual channel of the buffer or the arbiter that are part of a congestion tree.

8. The method of claim 1, wherein a clock gating logic turns off the arbiter.

9. The method of claim 1, wherein the arbiter determines how to route one or more data packets.

10. An apparatus comprising:
    an arbiter to determine how to route one or more data packets; and
    a clock gating logic coupled to the arbiter to turn off the arbiter for a select number of clock cycles if no arbitration is to be performed on a corresponding buffer, wherein clock gating logic turns on the arbiter one or more clock cycles prior to finishing a dispatch of a packet through the corresponding buffer.

11. The apparatus of claim 10, wherein the clock gating logic turns off the arbiter if the corresponding buffer is empty.

12. The apparatus of claim 10, wherein the arbiter is an output arbiter and the corresponding buffer is an output buffer, the apparatus further comprising an output status memory to store a future status of the output buffer.

13. The apparatus of claim 10, further comprising a clock cycle counter coupled to the clock gating logic to store the select number of clock cycles.

14. The apparatus of claim 10, further comprising a crossbar to route the one or more data packets between an input port and an output port.

15. The apparatus of claim 10, further comprising a router that comprises the arbiter and the clock gating logic.

16. The apparatus of claim 10, wherein the arbiter is an input arbiter, the clock gating logic is an input clock gating logic, and the corresponding buffer is an input buffer.

17. The apparatus of claim 10, wherein the arbiter is an output arbiter, the clock gating logic is an output clock gating logic, and the corresponding buffer is an output buffer.

18. The apparatus of claim 10, further comprising a processor that comprises the arbiter, the buffer, or the clock gating logic.

19. The apparatus of claim 18, wherein the processor comprises a plurality of the processor cores.

20. A processor comprising:
storage means for storing a plurality of data packets;
routing means for determining how to route the plurality of data packets;
means for reducing power consumption of the routing means for a select number of clock cycles if no arbitration is to be performed on the storage means; and
means for determining the select number of clock cycles based on a number of clock cycles that it takes to dispatch a packet through the storage means.

21. The processor of claim 20, further comprising means for turning on the routing means one or more clock cycles prior to finishing a dispatch of a packet through the storage means.

22. The processor of claim 20, further comprising means for reducing a level of a voltage supplied to one or more of a virtual channel of the buffer or the arbiter that are part of a congestion tree.

23. A system comprising:
a memory to store a plurality of data packets;
an arbiter to determine how to route the plurality of data packets;
a clock gating logic to generate a clock signal to control an operation of the arbiter based on one or more of: whether the memory is empty, or whether there will be no arbitration performed on the memory for a select number of clock cycles; and
a clock cycle counter coupled to the clock gating logic to store the select number of clock cycles.

24. The system of claim 23, further comprising an audio device.

25. The system of claim 23, wherein the memory is one or more of a RAM, DRAM, SRAM, or SDRAM.

26. The system of claim 23, further comprising a crossbar to route one or more data packets between an input port and an output port.

* * * * *